United States Patent

Cox

[11] 4,174,672
[45] Nov. 20, 1979

[54] SHIP'S PROPELLER SHAFT SEALING ASSEMBLY

[76] Inventor: James H. Cox, 31 Hurstleigh Dr., Redhill, Surrey, RH1 2AA, England

[21] Appl. No.: 861,709

[22] Filed: Dec. 19, 1977

[30] Foreign Application Priority Data

Dec. 20, 1976 [GB] United Kingdom ............... 53042/76

[51] Int. Cl.² .................... E21B 33/00; F16J 9/00; F16J 15/00
[52] U.S. Cl. ...................................... 115/74; 277/59; 114/57
[58] Field of Search .................. 115/34 R, 74; 277/2, 277/59, 60, 29 R; 114/57

[56] References Cited

U.S. PATENT DOCUMENTS

| | | | |
|---|---|---|---|
| 3,403,915 | 10/1968 | Roberts | 277/59 |
| 3,521,890 | 7/1970 | Holmes | 277/59 |
| 3,653,350 | 4/1972 | Koons | 115/34 R |
| 3,972,396 | 8/1976 | Bochnak | 277/2 |

FOREIGN PATENT DOCUMENTS 650693  2/1951  United Kingdom .
1238208  7/1971  United Kingdom .

Primary Examiner—Trygve M. Blix
Assistant Examiner—D. W. Keen
Attorney, Agent, or Firm—Kane, Dalsimer, Kane, Sullivan and Kurucz

[57] ABSTRACT

A shaft, and especially a ship's propeller shaft, sealing assembly which comprises a solid housing structure having a central bore for receiving the shaft, the housing structure accommodating two seals spaced axially along the bore and a void chamber between the seals. The void chamber gives an indication of seal failure and its radial extent is defined by a solid inner wall of the housing structure.

8 Claims, 3 Drawing Figures

SHIP'S PROPELLER SHAFT SEALING ASSEMBLY

This invention relates to a sealing assembly for a propeller shaft in the stern frame of a ship aft of the rearmost shaft bearing assembly, the arrangement preventing ingress of sea water into the bearing assembly and also preventing egress of bearing lubricant from the bearing assembly into the sea water.

The present invention provides a ship's propeller shaft sealing assembly comprising a solid housing structure accommodating two sealing means spaced axially along the shaft and a void chamber, having an outlet, between the sealing means, a solid inner wall of the housing defining the radial extent of the void chamber, the chamber being so arranged that sea water leaking past the aft sealing means or lubricating oil leaking past the forward sealing means will enter the chamber and pass through the outlet.

A major problem associated with oil lubricated stern bearing systems has been the difficulty of maintaining satisfactory sealing and preventing leakage of sea water into the oil space of the rearmost shaft bearing assembly or leakage of oil into the sea.

A sealing assembly constructed in accordance with the invention will not only provide good sealing characteristics but will also provide and indication of seal failure well before the damage becomes irreparable. Thus the outlet from the void chamber can be connected inboard to a tundish which is connected either to the bilgo or to a slop tank. Any leakage from either sealing means can then be readily observed from inboard. Because the sealing system gives an early indication of seal failure, unscheduled dry-docking and therefore excessive repair bills can be avoided.

Further, because the void space is defined by a solid wall of the housing structure, it not only serves as a means for detecting leakage as referred to above, but it also functions as a further barrier against possible pollution.

Further, because a void chamber is disposed between the forward sealing means (or oil seal) and the aft sealing means (or water seal) the oil in the shaft bearing assembly can be under a low head of pressure. As a result, the oil seal operates in a low pressure environment reducing the risk of overheating and minimising the tension of retaining means (for example a garter spring) for the oil seal thereby reducing wear of the oil seal.

Advantageously, a passage is provided in the housing structure which is open at one end to a forward sealing face of the aft sealing means (water seal), and at the other end to the outside of the housing structure. The pressure drop across the aft sealing means is balanced in this way, to reduce wear on the forward sealing face of the aft sealing means.

Preferably the housing structure is made up of a plurality of solid housing units which are releasably secured together. This enables the sealing assembly to be fitted onto the shaft very easily, after the positioning and the lining up of the shaft. Further it allows the housing to be dismantled to facilitate access for maintenance and examination. Further, because the housing structure can be split up into a number of units, adjustment and compensation for discrepancies in the position and alignment of the shaft is facilitated.

Advantageously one unit of the housing structure accommodates the aft sealing means, another unit accommodates the forward sealing means, and a further unit between the units accommodating the sealing means defines the void chamber. This allows for greater flexibility in assembly, maintenance and replacement of the working parts of the sealing assembly.

Further to facilitate assembly or improve accessibility for maintenance or inspection, each of the housing units for the sealing means can be made up of two or more parts.

Advantageously, the forward sealing means (oil seal) is arranged to prevent leakage of sea water from the void chamber, pressure of sea water in the void chamber serving to increase its sealing effect against ingress of sea water.

The present invention further provides a shaft sealing assembly comprising a solid housing structure having a central bore for receiving a shaft, the housing structure accommodating two shaft sealing means spaced axially along the bore, and a void chamber, having an outlet, between the sealing means, a solid inner wall of the housing structure defining the radial extent of the void chamber.

A ship's propeller shaft sealing assembly constructed in accordance with the invention will now be described, by way of example only, with reference to the accompanying drawings, wherein.

Figure 3:
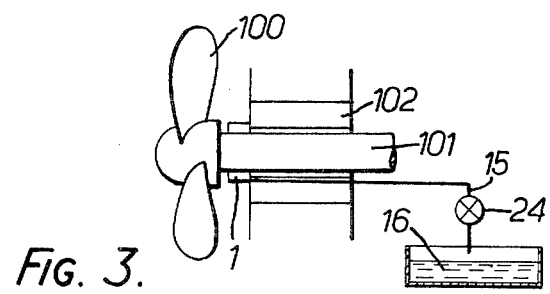
FIG. 3 is a diagrammatic sketch of a ship's stern tube showing the propeller shaft and its sealing assembly.

Referring to the accompanying drawings, and in particular FIG. 3, a propeller 100 is mounted on a shaft 101 which is supported in bearings (not shown) in a ship's stern tube 102. As will be seen in FIG. 1 the shaft 101 has a sleeve or liner 103 bolted to the propeller 100. The region 104 around the bearing contains a fluid lubricant under a low head of pressure, and the region 105 between the propeller and the frame is occupied by sea water and it is desirable to keep the two fluids separate and also to keep the sea water from the shaft surface as much as possible. Moreover it is desirable to be able to disassemble components of the seal for examination or maintenance from time to time without dismantling the propeller.

A ship's propeller shaft sealing assembly indicated generally at 1 comprises essentially three housing units indicated generally at 2, 3 and 4. Each unit is solid and may be formed of cast iron, cast steel or bronze.

The unit 2 is a water seal housing and comprises a retaining plate 2a and a housing part 2b secured together by bolts 5; and the unit 4 is an oil seal housing comprising two parts 4a and 4b secured together by bolts 6. The part 2b of unit 2 is secured to the unit 3, and the unit 3 secured to the part 4a of unit 4, by respective bolts 7 and 8. The part 4b of unit 4 is securely fixed to the stern frame or tube 102 by means of bolts (not shown) which are passed through openings 9 formed in the part 4b.

Arranged between the parts 2a and 2b of unit 2 is an annular seal 10 of an approved type which is well known, and which is formed of a suitable elastomeric material such as rubber or synthetic rubber. The seal has an annular lip portion 10a, the cylindrical face of which is secured, by a garter spring 11, to the sleeve or liner 103 fixed to the propeller 100.

The garter spring 11 permits axial movement of the shaft 101 relative to the seal 10 while maintaining sufficient grip to prevent leakage and to provide a positive drive to the seal 10. The lip portion 10b has a flat annular face which rotates against the wall of the part 2b of unit 2 thereby forming a rotary face seal in that region. The radial extent of the portion 10b is less than the radial extent of the chamber in which the seal 10 is mounted thereby allowing radial movement of the shaft 101 and corresponding radial movement of the seal 10.

The part 2b of the unit 2 is provided with a number of angularly spaced passages 12 each of which communicates with the radial face of the lip seal 10. The passages 12 are in communication with the sea water and have the effect of reducing to a minimum the pressure difference across the portion 10b of the seal 10 thereby reducing wear at the seat face of unit 2b. The radial face seal 10 between the parts 2a and 2b prevents or controls the passage of sea water into the hull.

Defined mainly by a solid inner wall 13 of the unit 3 and between the two units 2 and 4 is an annular void chamber 14. The bottom of the chamber 14 has an outlet passage 15 which passes through the units 3 and 4 and is connected inboard to the bilge or slop tank 16 (see FIG. 3). Arranged between the unit 3 and part 4a of unit 4 is an annular lip seal 17 which is of standard approved and of a well-known type, which is formed of a suitable elastomeric material such as rubber or synthetic rubber capable of retaining lubricating oil in the stern tube. The lip seal 17 has an outer peripheral portion 17a which is removably secured between shouldered portions of the part 4a and unit 3.

The annular lip portion 17b of the seal is urged by a garter spring 18 into sealing contact with the liner or sleeve 103 of the propeller shaft.

A similar lip seal 19 is provided between the parts 4a and 4b of unit 4 and again this seal is provided with outer and inner peripheral portions 19a and 19b respectively, the former 19a being clamped between shouldered portions of the parts 4a and 4b, and the inner peripheral portion 19b being urged by a garter spring 20 into sealing contact with the sleeve or liner 103 of the propeller shaft.

A lubricating oil chamber 21 is formed between the two oil lip seals 17 and 19 and oil is passed into that chamber by removing a plug 22 provided in the part 4a. The oil in the chamber 21 is filled with lubricating oil to lubricate the aftermost oil lip seal 17. Any leakage of oil from seal 19 would equalise the pressures on each side of seal 19. The seal 17 serves to prevent water in the void chamber passing into the oil chamber 21 as explained below and the tension of the garter spring 18 is sufficient to seal against oil leaving the chamber 21 and passing into the void chamber 14. The seal 19, on the other hand, serves to prevent oil passing from the oil space 104 of the shaft bearing to the oil chamber 21.

Oil can be removed from the chamber 21 by removing a further plug 23.

The water radial face seal 10, as mentioned above, serves to prevent or control the ingress of sea water into the hull. The two oil lip seals on the other hand prevent or control the ingress of lubricating oil from the bearing into chamber 14.

If, in use, sea water leaks past the water seal 10, then it enters the void chamber 14 and is passed from there via the passage 15 to the bilge or slop tank 16. The latter is arranged inboard and periodic inspection of this will show whether there has been any leakage. The void chamber 14 therefore provides a method of indicating that there is a fault in the water seal 10.

The volume of the void chamber 14 is chosen so that any fluid arriving in the chamber will flow out at a rate of about 450 liters per hour. In the event of any leakage fluid exceeding this rate of flow, sea water leaking past the water seal 10 would then fill up the void space, subsequently building up a pressure in this chamber, this pressure being related to the head of water above the propeller shaft.

In this emergency condition a greater pressure would be exerted on the adjacent oil seal 17. However, the latter is so disposed that it seals harder onto the shaft liner 103, thereby creating a much more positive seal, as the pressure in the void chamber 14 increases. The seal 17 will provide a reliable sealing effect, therefore, until such time as maintenance can be carried out on the water sealing assembly.

If, during use, oil leaks past the oil lip seals 17 and 19 into the void chamber, then again this can be detected because such oil will pass through the passage 15 and into the bilge tank 16. Again, therefore, any fault in the oil seals will be detected before any real damage can be caused.

The passage 15 to the slop tank 16 will be open in normal use but excessive leakage of sea water or oil to the tank can be stopped, temporarily, by closing a shut-off valve 24 (see FIG. 3) in the line to the bilge tank.

Because the seal is made up of a number of modular units constituted in this example, in total by five casing parts, it is possible to inspect, repair or replace the seals without removing the propeller.

Figure 1:
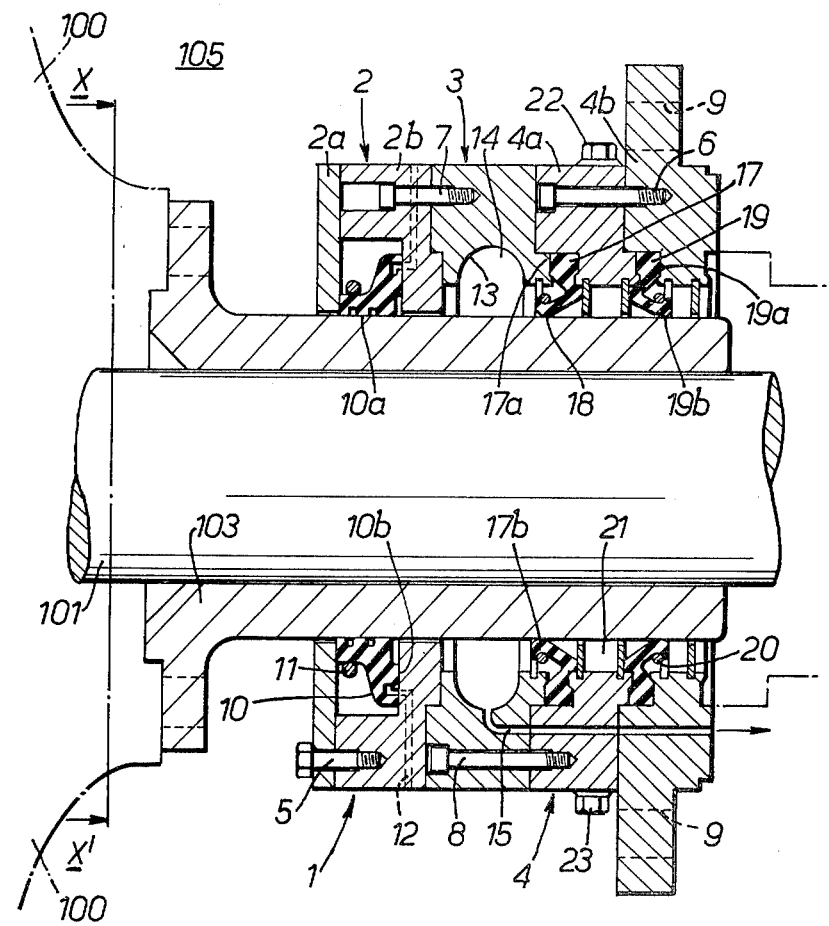
FIG. 1 is a longitudinal section through the sealing assembly.
Figure 2:
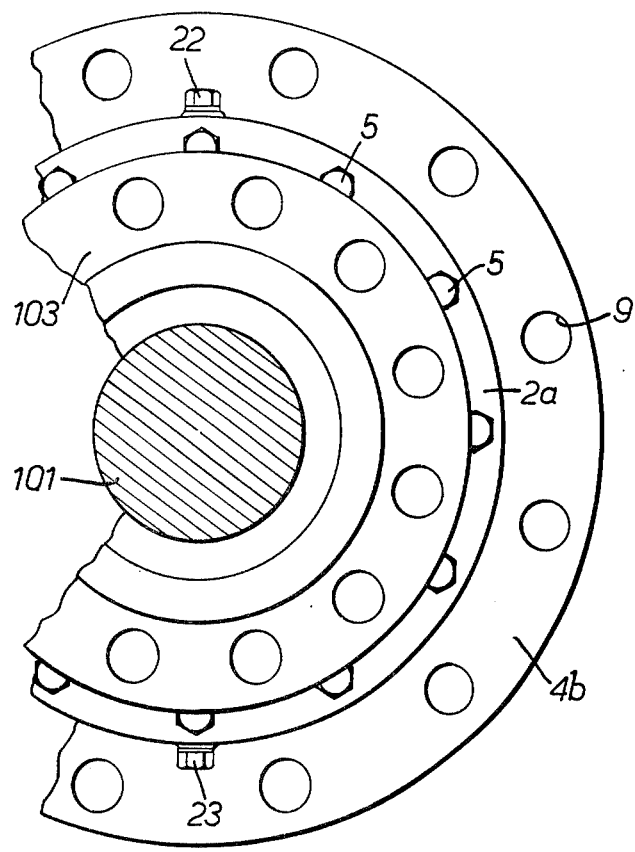
FIG. 2 is a section taken on the line X—X of FIG. 1.

Thus referring to FIG. 1, in order to inspect, repair or replace the foremost oil seal 19, the retaining plate 2a is removed by loosening the bolts 5. Next the bolts 7, 8 and 6 are loosened and removed so that the casing part 4a as well as the component parts of the units 2 and 3 can be displaced towards the propeller. Repair or replacement of the foremost oil lip seal 19 may now be carried out because there is sufficient space available to get at the seal without removing the propeller. The inspection, repair or replacement of the other seals shown in FIG. 1 may be carried out in a manner substantially similar to that described above.

The ship's propeller shaft sealing assembly described and illustrated above may be modified in a number of respects. Thus the sealing assembly described and illustrated comprises five casing parts, but it would be possible to use a minimum number of three such casing parts. That is to say the units 2, 3 and 4 could each be integrally formed.

Each of the units 2, 3 and 4 is annular in form allowing it to be slipped over the propeller shaft when the propeller is removed. However it would also be possible for each unit to be made in two or more part annular portions which are secured together for example by bolting. Thus, for example, each unit may comprise two C-shaped parts which are secured together.

The sealing assembly described and illustrated above incorporates a number of lip-type seals. However radial or face seals, at least for the water sealing side of the system, could be used.

Further, although it is desirable to have both the oil seals 17 and 19 to provide an added safeguard against leakage, one of them may be omitted. Thus the seal 19 only provides an additional safeguard against oil escaping from the bearing region 104 and into the void chamber 14 should the seal 17 become faulty.

What I claim is:

1. A ship's propeller shaft sealing assembly comprising a rigid housing structure accommodating two sealing means spaced axially along the shaft, the housing structure being secured to the ship's stern tube bearing so that the forward sealing means is aft of the stern tube bearing, and a chamber between the sealing means and having an outlet, an immovable rigid inner wall of the housing structure defining the radial extent of the chamber, the chamber being empty, unless there is leakage past either of the seals, and the outlet being connected to an inboard collector so as to allow such leakage to be gravity-fed from the chamber to the collector.

2. A sealing assembly as claimed in claim 1, in which the housing structure is attached as a unit to the said bearing.

3. A sealing assembly as claimed in claim 1, in which each sealing means comprises a lip-seal in sealing engagement with a liner on the shaft.

4. A sealing assembly as claimed in claim 1, in which the housing structure is made up of a plurality of solid housing units which are releasably secured together.

5. A sealing assembly as claimed in claim 4, in which one unit of the housing structure accommodates the aft sealing means, another unit accommodates the forward sealing means, and a further unit between the units accommodating the sealing means defines the chamber.

6. A sealing assembly as claimed in claim 5, in which the housing units for the sealing means can be made up of two or more parts.

7. A sealing assembly as claimed in claim 1, in which a passage is provided in the housing structure which is open at one end to a forward sealing face of the aft sealing means, and at the other end to the outside of the housing structure.

8. A sealing assembly as claimed in claim 1, in which the forward sealing means is arranged to prevent leakage of sea water from the chamber into the bearing, pressure of any sea water in the chamber serving to increase its sealing effect against ingress of that water.

* * * * *